US008838262B2

(12) United States Patent
Mehta et al.

(10) Patent No.: US 8,838,262 B2
(45) Date of Patent: Sep. 16, 2014

(54) SYNCHRONIZATION AND SWITCH OVER METHODS AND SYSTEMS FOR AN ADAPTIVE AUDIO SYSTEM

(75) Inventors: Sripal S. Mehta, San Francisco, CA (US); Sergio Martinez, San Francisco, CA (US); Ethan A. Grossman, Mill Valley, CA (US); Brad Thayer, San Francisco, CA (US); Dean Bullock, Novato, CA (US); John Neary, Pleasant Hill, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/127,135

(22) PCT Filed: Jun. 27, 2012

(86) PCT No.: PCT/US2012/044427
§ 371 (c)(1),
(2), (4) Date: Dec. 17, 2013

(87) PCT Pub. No.: WO2013/006342
PCT Pub. Date: Jan. 10, 2013

(65) Prior Publication Data
US 2014/0139738 A1 May 22, 2014

Related U.S. Application Data

(60) Provisional application No. 61/504,005, filed on Jul. 1, 2011, provisional application No. 61/636,456, filed on Apr. 20, 2012.

(51) Int. Cl.
*G03B 31/00* (2006.01)
*H04R 3/00* (2006.01)
*H04N 9/475* (2006.01)
*G06F 17/30* (2006.01)

(52) U.S. Cl.
USPC ............... 700/94; 348/515; 352/12; 381/123

(58) Field of Classification Search
CPC .......... H04N 21/4341; H04N 21/2368; H04N 21/4305; H04N 7/50; H04N 5/04; G03B 31/00; G03B 31/04; G01L 19/048; H04H 20/95; H04H 40/27; H04H 20/44; H04H 20/28; H04H 20/10; H04H 20/86
USPC .......... 348/738, 515; 370/503, 516, 517, 519, 370/509–512; 375/240.28; 352/12, 23; 700/94; 381/123; 704/270, 500
See application file for complete search history.

(56) References Cited

U.S. PATENT DOCUMENTS

| | | | | |
|---|---|---|---|---|
| 5,351,090 | A * | 9/1994 | Nakamura | 348/484 |
| 5,548,346 | A * | 8/1996 | Mimura et al. | 348/738 |
| 5,760,825 | A * | 6/1998 | Grenier | 348/14.07 |
| 6,067,126 | A * | 5/2000 | Alexander | 348/738 |
| 6,588,015 | B1 * | 7/2003 | Eyer et al. | 725/89 |
| 6,630,963 | B1 * | 10/2003 | Billmaier | 348/485 |
| 6,829,018 | B2 * | 12/2004 | Lin et al. | 348/738 |
| 6,862,044 | B2 * | 3/2005 | Kariatsumari | 348/515 |
| 7,075,592 | B2 * | 7/2006 | Morikawa | 348/738 |
| 7,333,150 | B2 * | 2/2008 | Cooper | 348/515 |
| 8,064,754 | B2 * | 11/2011 | Lomba et al. | 386/338 |
| 2001/0004343 | A1 * | 6/2001 | Sato | 369/47.12 |
| 2006/0245729 | A1 * | 11/2006 | Itoh et al. | 386/96 |
| 2007/0276670 | A1 * | 11/2007 | Pearlstein | 704/270 |
| 2010/0040349 | A1 * | 2/2010 | Landy | 386/96 |
| 2010/0271560 | A1 * | 10/2010 | Higuchi et al. | 348/738 |
| 2010/0324915 | A1 | 12/2010 | Seo | |
| 2012/0013746 | A1 * | 1/2012 | Chen et al. | 348/180 |
| 2012/0081604 | A1 * | 4/2012 | Hosokawa | 348/515 |
| 2012/0185570 | A1 * | 7/2012 | Bouazizi et al. | 709/219 |
| 2013/0124984 | A1 * | 5/2013 | Kuspa | 715/255 |
| 2014/0067102 | A1 * | 3/2014 | Sanders et al. | 700/94 |

FOREIGN PATENT DOCUMENTS

| | | |
|---|---|---|
| EP | 2194527 | 6/2010 |
| WO | 2008/039039 | 4/2008 |
| WO | 2011/020065 | 2/2011 |

OTHER PUBLICATIONS

Cosette, Stan G. et al., "New Techniques for Audio Metadata Use and Distribution", Presented at 107th Convention in New York, pp. 1-12, Sep. 24, 1999.

"Proposed SMPTE Standard for Television Format for Non-PCM Audio and Data in an AES3 Serial Digital Audio Interface", SMPTE-Motion Picture and Television Engineers, vol. 109, No. 4, pp. 328-332, Apr. 1, 2000.

SMPTE 428-3-2006 standard entitled "D-Cinema Distribution Master Audio Channel Mapping and Channel Labeling" published on Sep. 29, 2006.

\* cited by examiner

*Primary Examiner* — Victor Kostak

(57) ABSTRACT

Embodiments are described for a synchronization and switchover mechanism for an adaptive audio system in which multi-channel (e.g., surround sound) audio is provided along with object-based adaptive audio content. A synchronization signal is embedded in the multi-channel audio stream and contains a track identifier and frame count for the adaptive audio stream to play out. The track identifier and frame count of a received adaptive audio frame is compared to the track identifier and frame count contained in the synchronization signal. If either the track identifier or frame count does not match the synchronization signal, a switchover process fades out the adaptive audio track and fades in the multi-channel audio track. The system plays the multi-channel audio track until the synchronization signal track identifier and frame count and adaptive audio track identifier and frame count match, at which point the adaptive audio content will be faded back in.

20 Claims, 6 Drawing Sheets

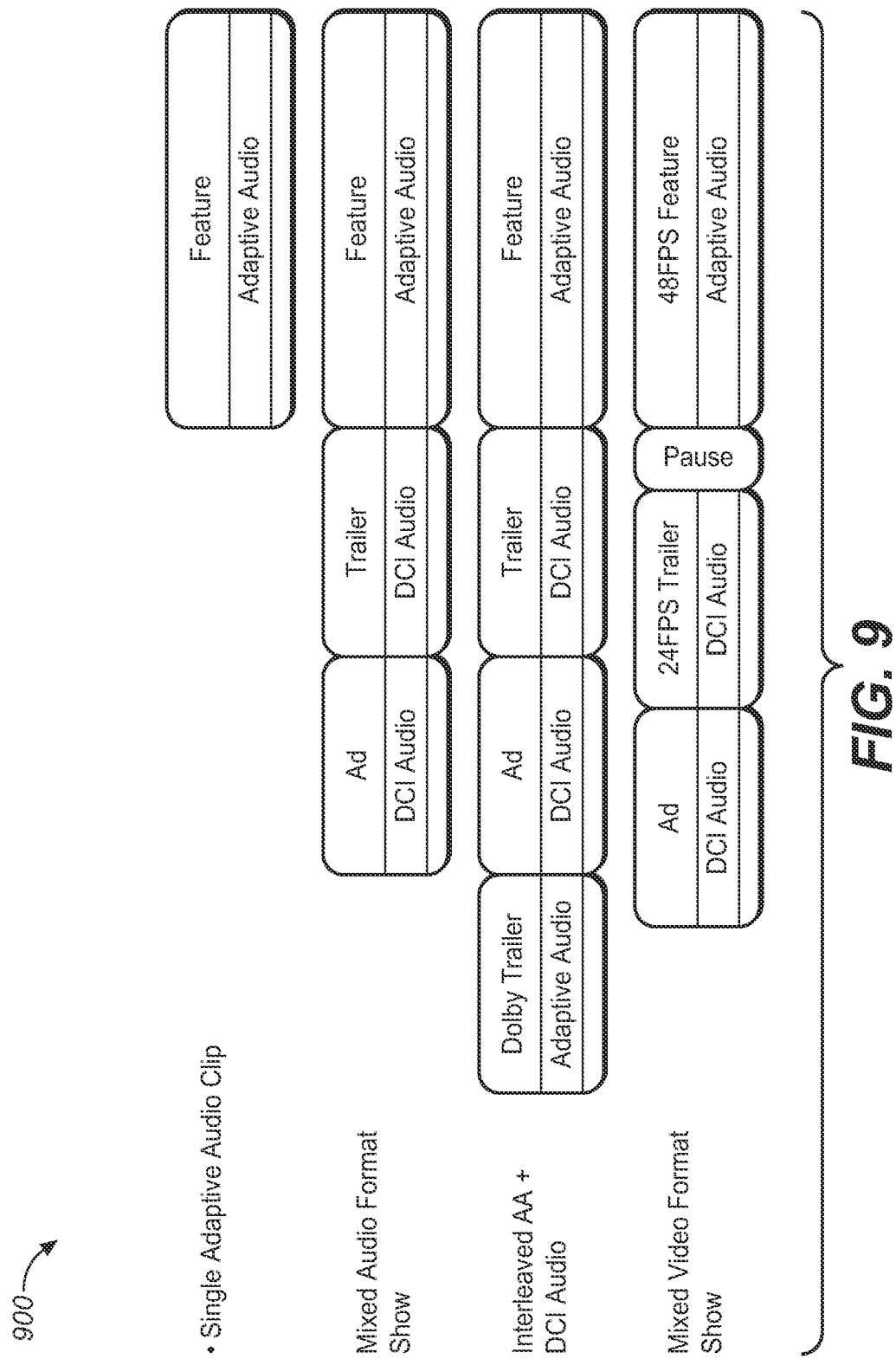

SYNCHRONIZATION AND SWITCH OVER METHODS AND SYSTEMS FOR AN ADAPTIVE AUDIO SYSTEM

CROSS-REFERENCE TO RELATED APPLICATIONS

This application claims priority to U.S. Provisional Application No. 61/504,005 filed 1 Jul. 2011 and U.S. Provisional Application No. 61/636,456 filed 20 Apr. 2012, both of which are hereby incorporated by reference in entirety for all purposes.

FIELD OF THE INVENTION

One or more implementations relate generally to audio signal processing, and more specifically to audio stream synchronization and switchover methods in an adaptive audio system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Present digital cinema servers send compressed streams of video data in a defined format (e.g., JPEG 2000 video) to a media block along with multiple channels of digitized audio, for example 16 channels of PCM (pulse-code modulated) audio at a 48 kHZ sample rate. The audio content is a packetized stream that may have different formats depending on the vendor of the cinema system. The audio and video signals may be encrypted prior to being input to the media block. The media block decrypts the JPEG video into an uncompressed baseband signal, and transmits the audio to a cinema processor to be conditioned for the playback environment. The cinema processor performs functions such as equalization for the playback environment and routes the audio signals to the appropriate speakers in a surround sound array based on speaker channel labels provided in the in audio content. The ultimate output comprises a video feed that goes out in HD-SDI (high definition serial digital interface) format to a projector, and analog audio is sent to the amplifiers and speakers. For proper playback, the audio tracks must be properly synchronized to the video content.

In general, A/V synchronization is not particularly precise in theater environments and theater technicians generally do not measure A/V synchronization today during installation/calibration. Film A/V synchronization is said to be accurate to within 1.5 frames (63 ms @24 fps). Since sound travels at about 1 ft/ms, A/V synchronization can vary by up to 50 ms depending on the location of the listener in the theater. In present cinema systems the timing of the audio and video signals is well known so that audio and video are normally synchronized. The latencies of well-established components, such as processors and projectors are also well known, for example, projector latency is typically specified at around two frames or 88 ms, so that the cinema server can usually be programmed to accommodate different timing characteristics to ensure proper synchronization. In typical applications, the media block has two real-time components, the HD-SDI interface and an AAS (audio amplifier system) interface. These are real time interfaces and can be configured to provide A/V output that is synchronized or programmed with some delay as appropriate. Thus, despite a certain amount of imprecision in present systems, the timing between the audio and video content is fixed, so that when a digital audio sample is sent to the cinema processor, it will be followed by a fairly precise interval (e.g., $\frac{1}{24}$ second later) by an analog audio signal sent to the amplifiers.

A new adaptive audio processor and object-based audio format has been developed that allows audio to be transmitted over a side-band Ethernet connection. This Ethernet connection provides a high-bandwidth conduit to transmit multiple complex audio signals. Assuming that the bandwidth of a single channel of digital audio is 1.5 megabits/sec. (Mbps), the bandwidth for a present 16-channel system (e.g., AES8) is on the order of 24 Mbits/sec. (16×1.5 Mbits/sec.). In contrast, the bandwidth of an Ethernet connection in this application is on the order of 150 Mbits/sec., which allows up to 128 discrete complex audio signals. This adaptive audio system sends audio content from a RAID array (or similar storage element) in non real-time over Ethernet from a digital cinema server to an adaptive audio cinema processor. Ethernet is a bursty, non-real time and non-deterministic transmission medium. Thus, the inherent audio/video synchronization feature of present cinema processing systems is not applicable to this type of adaptive audio system. The audio that is provided via Ethernet must be synchronized to the video through an explicit synchronization function. To align the audio content, delivered via Ethernet, to the video signal, there must be a deterministic latency to properly synchronize the audio and video content.

BRIEF SUMMARY OF EMBODIMENTS

Traditional digital cinema servers deliver audio and video signals to a single media block. The media block then decodes, time-aligns and delivers them in a synchronized manner. In an adaptive audio system, the audio content is delivered in two separate content types, multi-channel audio (e.g., 5.1 or 7.1 surround sound content) and object-based adaptive audio that comprises channel-based sound with metadata that encodes location information for sound playback within the playback environment. In an adaptive audio system, the high-bitrate adaptive audio is sent from a digital cinema server via Ethernet to an adaptive audio processor. This constitutes a non-real-time or non-deterministic audio stream. In order to synchronize the adaptive audio content to the video provided by the cinema server, a synchronization signal is associated with the multi-channel audio to allow the adaptive audio processor to determine which frame of the adaptive audio to play out.

In an embodiment, the synchronization signal is embedded in the multi-channel audio stream and contains track identifier and frame count information to keep the adaptive audio content synchronized to the multi-channel audio content. This provides a mechanism to ensure proper audio/video synchronization in the playback environment. If an error occurs such that the adaptive audio frame is not available, or if the track identifier and frame number information does not match the synchronization signal, or if it is desired to playback the multi-channel content instead of the adaptive audio content, a switchover process is invoked. The switchover process comprises a fader component that causes the audio to faded to silence followed by the multi-channel audio track faded from silence to a current level. The system will continue to play the multi-channel audio track until the synchronization signal frame number and adaptive audio frame number match, at which time, the adaptive audio content will be faded back in.

Embodiments provide proper synchronization of audio and video signals in an adaptive audio-based cinema system. The system relies on the fact that channel-based audio is already synchronized to the video signal, and provides a signaling method that synchronizes the non-deterministic object-based adaptive audio content to the channel-based content. This audio-to-audio synchronization method provides proper timing, failover protection, and switching capabilities between the entire audio content (multi-channel audio plus adaptive audio) and the video signal.

Embodiments are described for a synchronization and switchover mechanism for an adaptive audio system in which both multi-channel (e.g., surround sound) audio is provided along with object-based adaptive audio content. A synchronization signal is embedded in the multi-channel audio stream and contains a track identifier and frame count for the adaptive audio stream to play out. The track identifier and frame count of a received adaptive audio frame is compared to the track identifier and frame count contained in the synchronization signal. If either the track identifier or frame count does not match the synchronization signal, a switchover process is invoked that fades out the adaptive audio track and fades in the multi-channel audio track. The system will continue to play the multi-channel audio track until the synchronization signal track identifier and frame count and adaptive audio track identifier and frame count match, at which point the adaptive audio content will be faded back in.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 9 illustrates different examples of content that include both channel-based audio and object-based adaptive audio, and that may utilize embodiments of a synchronization and switchover method.

DETAILED DESCRIPTION

Figure 1:
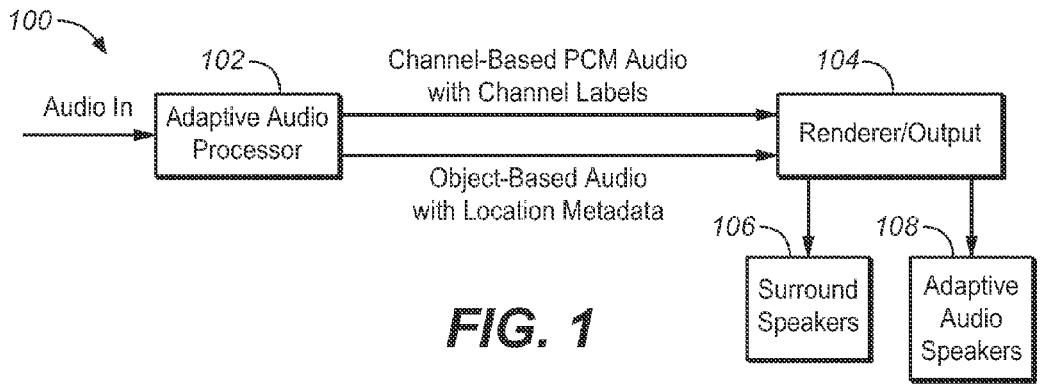
FIG. 1 is a block diagram of an adaptive audio system that implements a synchronization and switchover protection process, under an embodiment.

Systems and methods are described for a rendering stage of an adaptive audio system that synchronizes audio streams and provides switchover protection for playback of different types of audio streams in the event of unavailability of a preferred audio stream type. Aspects of the one or more embodiments described herein may be implemented in an audio or audio-visual system that processes source audio information in a mixing, rendering and playback system that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the following description, the term channel or audio channel means a monophonic audio signal or an audio stream plus metadata in which the position is coded as a channel ID, e.g. Left Front or Right Top Surround. A channel may drive multiple speakers, e.g., the Left Surround channels (Ls) will feed all the speakers in the Left Surround array. A channel configuration is a pre-defined set of speaker zones with associated nominal locations, e.g. 5.1, 7.1, and so on; 5.1 refers to a six-channel surround sound audio system having front left and right channels, one center channel, two surround channels, and one subwoofer channel; 7.1 refers to a eight-channel surround system that adds two additional surround channels to the 5.1 system. Examples of 5.1 and 7.1 configurations include Dolby® surround systems. An object or object channel is one or more audio channels with a parametric source description, such as apparent source position (e.g. three-dimensional coordinates), apparent source width, etc. For example, an object could be an audio stream plus metadata in which the position is coded as a three-dimensional position in space. The term 'adaptive audio' means object or channel-based audio content that is associated with metadata that controls rendering of the audio based on the playback environment.

In an embodiment, standard surround sound audio may be processed through conventional channel-based audio codecs that reproduce sound through an array of loudspeakers in predetermined positions relative to the listener. To create a complete multichannel audio program, sound engineers typically mix a large number of separate audio streams (e.g. dialog, music, effects) to create the overall desired impression. Audio mixing decisions are typically made by listening to the audio program as reproduced by an array of loudspeakers in the predetermined positions, e.g., a particular 5.1 or 7.1 system in a specific theatre. The final, mixed signal serves as input to the audio codec. In contrast to channel-based audio, object coding provides distinct sound sources (audio objects) as input to the encoder in the form of separate audio streams. Each audio object is associated with spatial parameters, which may include, sound position, sound width, and velocity information, among others. The audio objects and associated parameters are then coded for distribution and storage. Final audio object mixing and rendering is performed at the receive end of the audio distribution chain, as part of audio program playback. This step may be based on knowledge of the actual loudspeaker positions so that the result is an audio distribution system that is customizable to user-specific listening conditions. The two coding forms, channel-based and object-based, perform optimally for different input signal conditions. For example, channel-based audio coders are generally more efficient for coding input signals containing dense mixtures of different audio sources and for diffuse sounds. Conversely, audio object coders are more efficient for coding a small number of highly directional sound sources.

FIG. 1 is a block diagram of an adaptive audio system that implements a synchronization and switchover process, under an embodiment. As shown in system 100, audio inputs are provided to an adaptive audio processor block 102. The processor generates both channel-based PCM audio that includes speaker channel labels for sending channel-based audio signals to specific surround sound speakers or speaker groups in accordance with known surround sound conventions. The processor 102 also generates object-based audio that contains metadata that identifies specific speakers within the speaker array to play back corresponding audio objects. The location information is provided in the form of mathematical location functions that specify locations within a room of the playback environment in relation to the size and dimensions of the room and viewing screen, as opposed to specific speaker identifications or locations relative to a particular listener in the room. Such an audio system provides a more immersive audio experience and retains the intent of the sound engineer or mixer for all listeners in virtually any playback environment, since sounds are rendered based on an allocentric frame of reference. An allocentric reference is a spatial reference in which audio objects are defined relative to features within the rendering environment such as room walls and corners, standard speaker locations, and screen location (e.g., front left corner of a room), as opposed to an egocentric reference that is a spatial reference in which audio objects are defined relative to the perspective of a listener and often specified with respect to angles relative to a listener (e.g., 30 degrees right of the listener).

A renderer/output block 104 provides output to the appropriate speakers of a speaker array that may include both surround-sound speakers 106 in a defined configuration (e.g., 5.1 or 7.1) and additional speakers 108 for playback of the adaptive audio content. Such additional speakers may include ceiling-mounted top speakers, additional rear subwoofers, additional screen and side surround speakers, and so on. As used herein, the term 'playback system' refers to one or more components that together serve to perform rendering, amplification, and sound broadcasting functions, and may include a renderer, one or more amplifiers, buffers, speakers, interconnection components plus any other appropriate components in any combination or constitution of elements.

System 100 further includes an audio codec that is capable of efficient distribution and storage of multi-channel audio programs. It combines traditional channel-based audio data with associated metadata to produce audio objects that facilitates the creation and delivery of audio that is adapted and optimized for rendering and playback in environments that maybe different from the mixing environment. This allows the sound engineer to encode his or her intent with respect to how the final audio should be heard by the listener based on the actual listening environment of the listener. The components of system 100 comprise an audio encoding, distribution, and decoding system configured to generate one or more bitstreams containing both conventional channel-based audio elements and object-based audio elements. Such a combined approach provides greater coding efficiency and rendering flexibility compared to either channel-based or object-based approaches taken separately. Embodiments include extending a predefined channel-based audio codec in a backwards-compatible manner to include audio object coding elements. A new extension layer containing the audio object coding elements is defined and added to the 'base' or backwards-compatible layer of the channel-based audio codec bitstream. This approach enables one or more bitstreams, which include the extension layer to be processed by legacy decoders, while providing an enhanced listener experience for users with new decoders. One example of an enhanced user experience includes control of audio object rendering. An additional advantage of this approach is that audio objects may be added or modified anywhere along the distribution chain without decoding/mixing/re-encoding multichannel audio encoded with the channel-based audio codec.

Figure 2A:
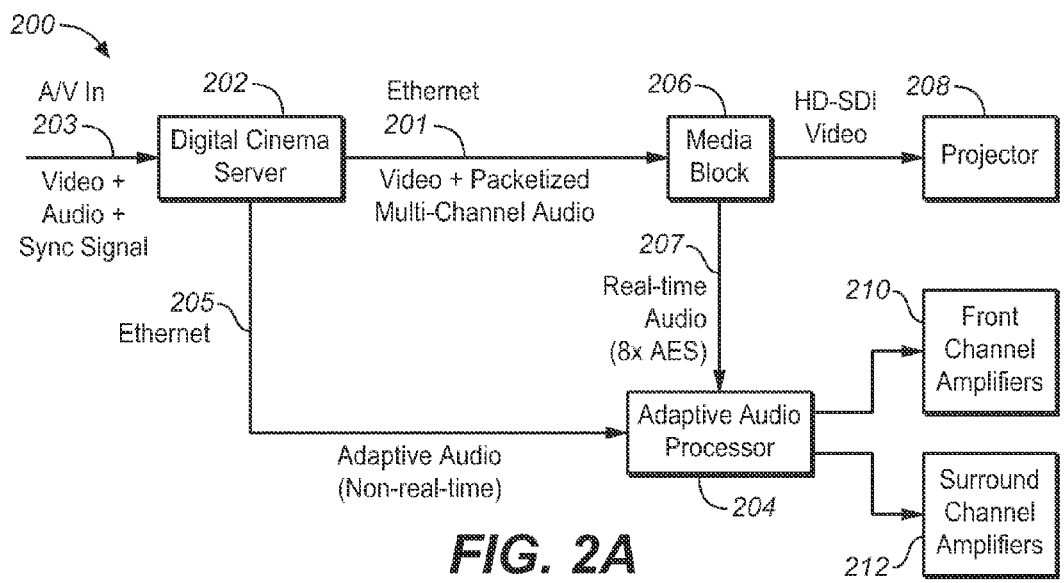
FIG. 2A is a block diagram of an adaptive audio system that includes an Ethernet side-channel for transmission of adaptive audio signals, under an embodiment in which the synchronization signal is associated with the multi-channel audio content.

In an adaptive audio system, the high-bitrate adaptive audio signal is sent from the digital cinema server via Ethernet to an adaptive audio processor. FIG. 2A is a block diagram of an adaptive audio system that includes an Ethernet side-channel for transmission of adaptive audio signals, under an embodiment. System 200 may represent a portion of a rendering sub-system for digital cinema processing system. As shown in system 200, audio/visual (A/V) input 203 is provided to a digital cinema server 202. The A/V input represents audio and video content that is authored by creators using authoring tools of the cinema processing system. For the embodiment of FIG. 2A, the A/V input signal 203 includes video data, audio data (channel and object-based audio plus location metadata), and a synchronization signal.

With respect to video content, the server 202 outputs the video content as compressed data (e.g., JPEG 2000) over a first gigabit Ethernet (1000BaseT) or similar line 201 to a media block 206, which then sends an appropriately formatted video signal (e.g., HD-SDI) to a projector 208.

With respect to audio content, the digital cinema server 202 outputs adaptive audio content over a second gigabit Ethernet line 205 to an adaptive audio processor 204. The adaptive audio content comprises object-based audio content that is associated with metadata that controls rendering of the audio based on the playback environment. Since the adaptive audio content is sent over an Ethernet connection, it is inherently non-deterministic and represents a non-real time audio component. The cinema server 202 also generates packetized multi-channel audio from the channel-based content of the A/V input 203. This is transmitted over the first Ethernet link 201 to the media block 206, which produces real-time audio content for transmission to the adaptive audio processor 204 over link 207. In an embodiment, the media block 206 formats the packetized multi-channel audio received over link 201 per a digital audio signal transport standard such as AES3 to produce the real-time audio content transmitted over link 207. In a typical implementation, the real-time audio comprises eight AES3 signals for a total of 16 channels 207.

The adaptive audio processor 204 operates in two modes: a cinema processor mode (traditional digital cinema) and an adaptive audio mode. In the cinema processor mode, multiple channels of audio are generated by the media block 206 and received for input to the adaptive audio processor 206 over line 207. In a typical implementation, this audio comprises eight AES3 signals for a total of 16 channels 207. The output of the adaptive audio processor 204 in the cinema processor mode (also referred to as AES or DCI audio) comprises, for example, 64 speaker feeds (or 7.1 arrays) output to surround channel amplifiers 212. An adjustable latency from, for example, 13 ms to 170 ms may be provided, along with B-Chain (EQ, bass management, limiting) processing. In general, the B-chain feeds refer to the signals processed by power amplifiers, crossovers and speakers, as opposed to A-chain content that constitutes the sound track on the film stock.

In the adaptive audio mode, the adaptive audio processor 204 operates as an audio media block with 1000baseT Ethernet from the server 202 for data/control. The eight AES channels 207 that are provided in from media block 206 are used for clocking and synchronization of the adaptive audio signals sent from server 202 over the second Ethernet channel 205. The latency of these signals is matched to the cinema processor mode through synchronization signal that is associated with the real-time audio content 207. With regard to adaptive audio rendering and B-chain processing, the synchronization signal is embedded into a defined channel (e.g., channel 13) of the DCI audio track file comprising the real-time audio. The adaptive audio content and frame information is streamed over Ethernet in non-real-time from the digital cinema server 202 to the adaptive audio processor 204. In general, frames are short, independently decodable segments into which a total audio program is divided, and the audio frame rate and boundary is typically aligned with the video frames. A comparator process or component within the adaptive audio processor 204 looks at the frame number in the synchronization signal, the frame information from the second Ethernet channel 205 and compares the two. If they match, the adaptive audio processor plays out the adaptive audio frame through the amplifiers 210 and 212. If frame information for the synchronization signal and the adaptive audio content do not match, or if the synchronization signal is not present, the processor will revert back to the real-time audio stream.

Figure 2B:
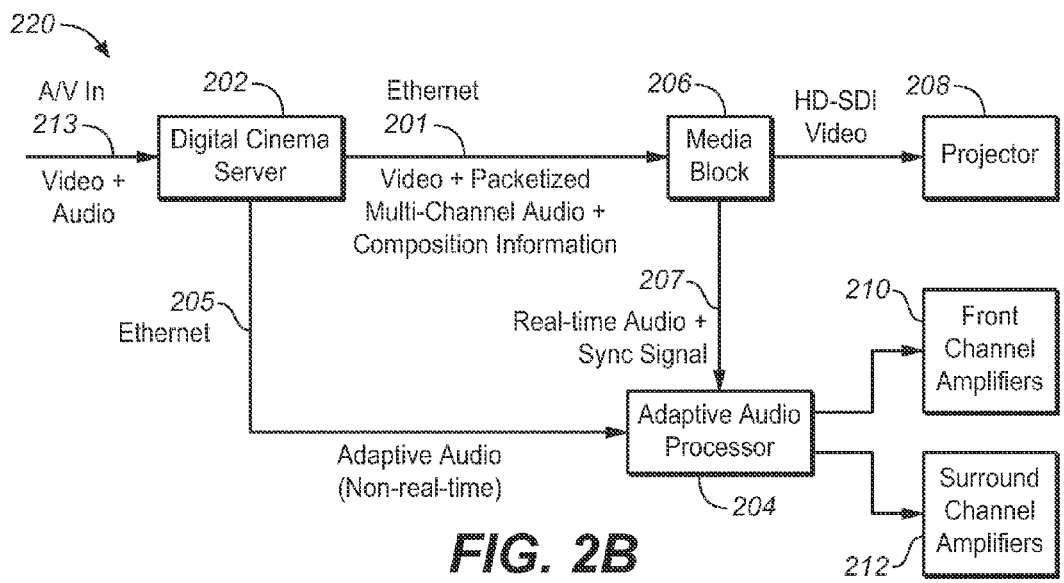
FIG. 2B is a block diagram of an adaptive audio system that includes an Ethernet side-channel for transmission of adaptive audio signals, under an alternative embodiment in which the synchronization signal is generated by a media block receiving the multi-channel audio content.

For the embodiment illustrated in FIG. 2A, the synchronization signal is generated and associated with or embedded in the audio signal of the input A/V content 203 during content mastering or authoring. In an alternative embodiment, the synchronization signal is automatically generated by a component or process in the rendering stage. FIG. 2B is a block diagram of an adaptive audio system in which the synchronization signal is generated by a media block receiving the multi-channel audio content. As shown in system 220 of FIG. 2B, the A/V input content comprises the audio and video content 213, which is input to the digital cinema server 202. The digital cinema server 202 is configured to transmit information regarding the composition of the content, also referred to as a composition playlist, to the media block 206. This composition playlist includes (1) video track file length in frames (i.e., the first frame of video to play out and the last frame of video to play out; (2) multichannel audio track file length in frames (i.e., the first frame of video to play out and the last frame of video to play out); and (3) adaptive audio track file length in frames (i.e., the first frame of adaptive audio to play out and the last frame of adaptive audio to play out). Additional or other information may also be included, as needed depending on implementation constraints and requirements. The synchronization signal is auto-generated by the media block 206 and transmitted in real-time over link 207 in AES3 format, for example, to the adaptive audio processor 204. By virtue of the content creation and mastering process, the multi-channel (over line 201) and adaptive audio track files (over line 205) must have the same number of samples/frames and must be time-aligned. If the media block 206 receives the composition playlist and an adaptive audio track file is called out, the media block can dynamically render the synchronization signal based on the current frame number of the multichannel audio track file being played out. It can cease outputting the synchronization signal when the content does not call out an adaptive audio track file.

Figure 3:
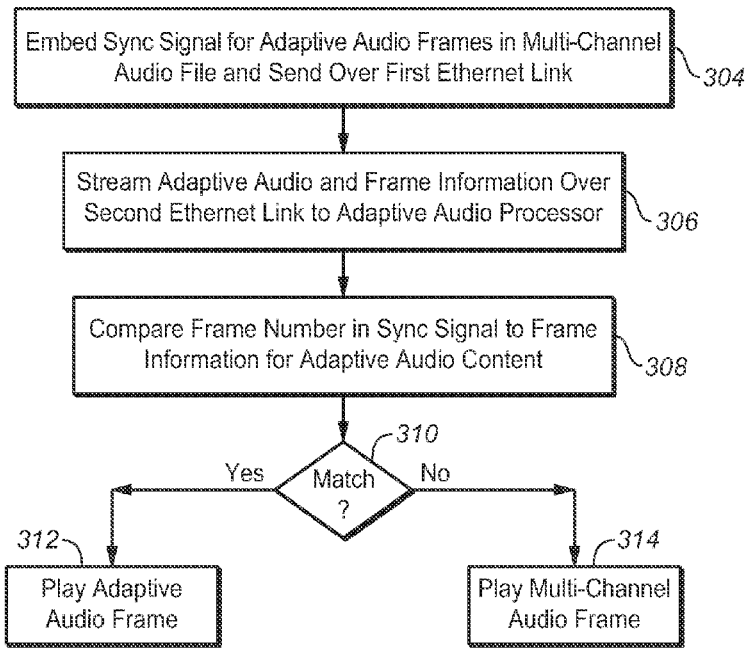
FIG. 3 is a flowchart that illustrates a method of synchronizing an adaptive audio track with a multi-channel audio track, under an embodiment.

FIG. 3 is a flowchart that illustrates a method of synchronizing an adaptive audio track with a multi-channel audio track, under an embodiment. As shown in FIG. 3, the process begins by embedding the synchronization signal as part of the multi-channel audio file that is transmitted over the first Ethernet link 201 from server 202. In an embodiment, for the real-time audio content transmitted over link 207, the AES synchronization signal is formatted as a specific non-audio stream (e.g., SMPTE 337M) that contains current frame count and track identifier information (e.g., UUID), and repeats multiple times per frame. As shown with respect to system 200 of FIG. 2A, the synchronization signal may be generated at rendering or packaging time and is inserted into track 13 of the real-time audio (DCI) track file, act 304. Alternatively, as shown with respect to system 220 of FIG. 2B, the synchronization signal may be generated by media block 206. The synchronization signal is referenced to the beginning of the audio track file. The adaptive audio signal and the associated frame information are streamed over the second gigabit Ethernet connection 205 to the adaptive audio processor 204, act 306. The system then compares the frame number in the synchronization signal to the adaptive audio frame information, act 308. If the frame numbers match, as determined in block 308, the adaptive audio frame is played, act 312. Otherwise an error condition exists, and the multichannel real-time audio is played instead, act 314.

In an alternative embodiment, the synchronization signal may be encoded as an audible audio signal using, for example, frequency-shift keying (FSK) as opposed to a non-audio, SMPTE 337M formatted stream. This allows synchronization signal to be robust to audio watermarking and sample rate conversion from between 48 kHz and 96 kHz, both of which may be applied by the media block before output as AES3 formatted signals over link 207.

The synchronization signal contains a track identifier in order to prevent the audio from one composition being played out with the video from a different composition. Having both the frame number and the track identifier (e.g., the track UUID) creates a unique association to prevent this from occurring. This possibility is demonstrated with reference to FIG. 9, where multiple clips within a show may contain adaptive audio with the same frame number. In this case, the different track identifiers prevent incorrect audio play out that may be caused by the association or misassociation of audio frames with different video clips.

Figure 4:
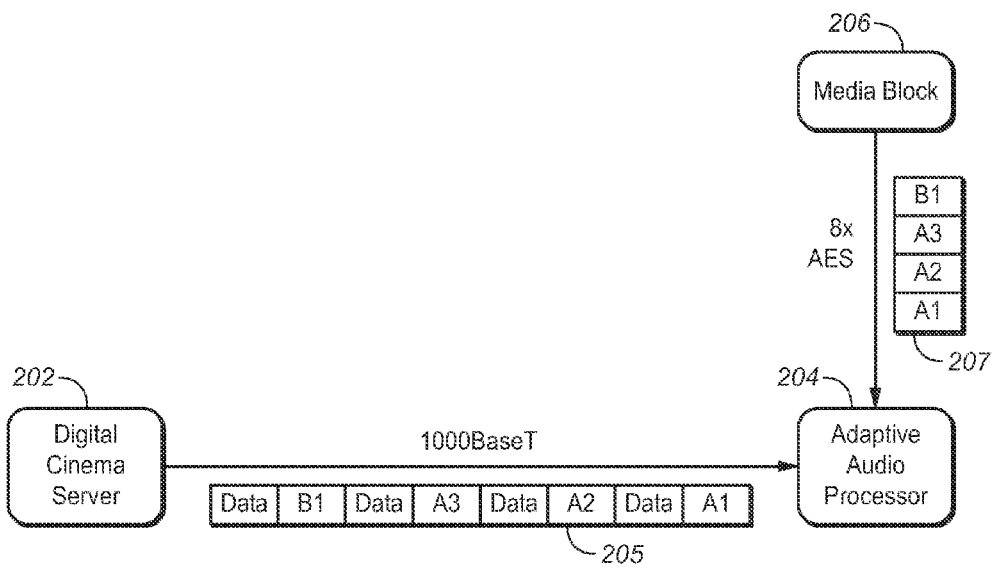
FIG. 4 illustrates the composition of the real-time audio content and the adaptive audio content as input to an adaptive audio processor, under an embodiment

The non-real time Ethernet packets that are sent from the digital cinema server 202 to the adaptive audio processor 204 over link 205 contain headers with track ID and frame count information. The track ID and frame count is embedded in the real-time audio track, and sent over the AES channels 207 from media block 206 to the adaptive audio processor 204. The adaptive audio processor compares the frame data from the Ethernet with that of the synchronization signal and plays out the adaptive audio frame if the frame is found. FIG. 4 illustrates the composition of the adaptive real-time channel data and the adaptive audio Ethernet data, under an embodiment. As shown in FIG. 4, the data packet sent over the gigabyte Ethernet link 205 from the server 202 to processor 204 includes data packets interleaved with frame information. For the example of FIG. 4, the Ethernet 205 data is organized into audio frames B1-A3-A2-A1. The real-time audio data transmitted over link 207 from media block 206 to processor 204 is encoded with the frame numbers encoded in the DCI audio synchronization signal. In this case, the example coding lists frames B1-A3-A2-A1. Since the frames match between the two signals, the adaptive audio content from the server 202 will be played out. If there is an error such that the frame numbers do not match, or if no synchronization signal is present, the real-time audio signal would play out instead of the adaptive audio signal.

Figure 5:
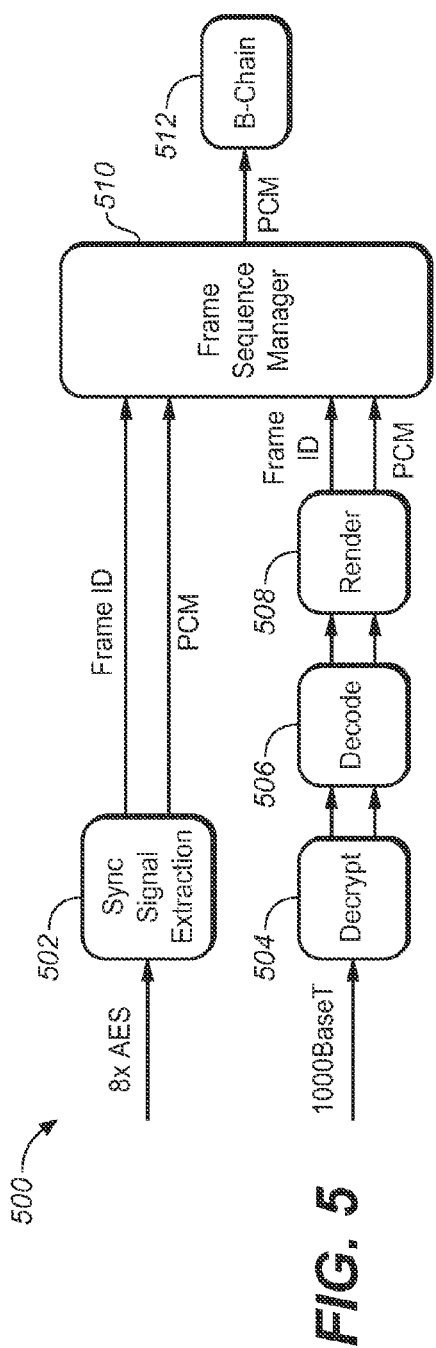
FIG. 5 is a diagram illustrating buffering and processing of the adaptive audio content, under an embodiment.

FIG. 5 is a diagram illustrating buffering and processing of the adaptive audio content, under an embodiment. The system 500 continuously processes the eight AES inputs, buffers the data and detects whether the synchronization signal is present. The real-time signals are input to a synchronization signal extraction block 502. The frame ID and PCM data is sent to a frame sequence manager 510. In parallel, the adaptive audio signal sent over the gigabit Ethernet link 205 is input to a decrypt block 504, a decode block 506, and a render block 508. The frame ID and PCM data generated by the render block 508 are input to the frame sequence manager 510. The frame sequence manager then decides which audio set, real-time audio or adaptive audio, to output depending on whether the synchronization signal is present and if the synchronization frame matches the adaptive audio frame. The selected output is then sent to the B-chain processor 512.

Figure 6:
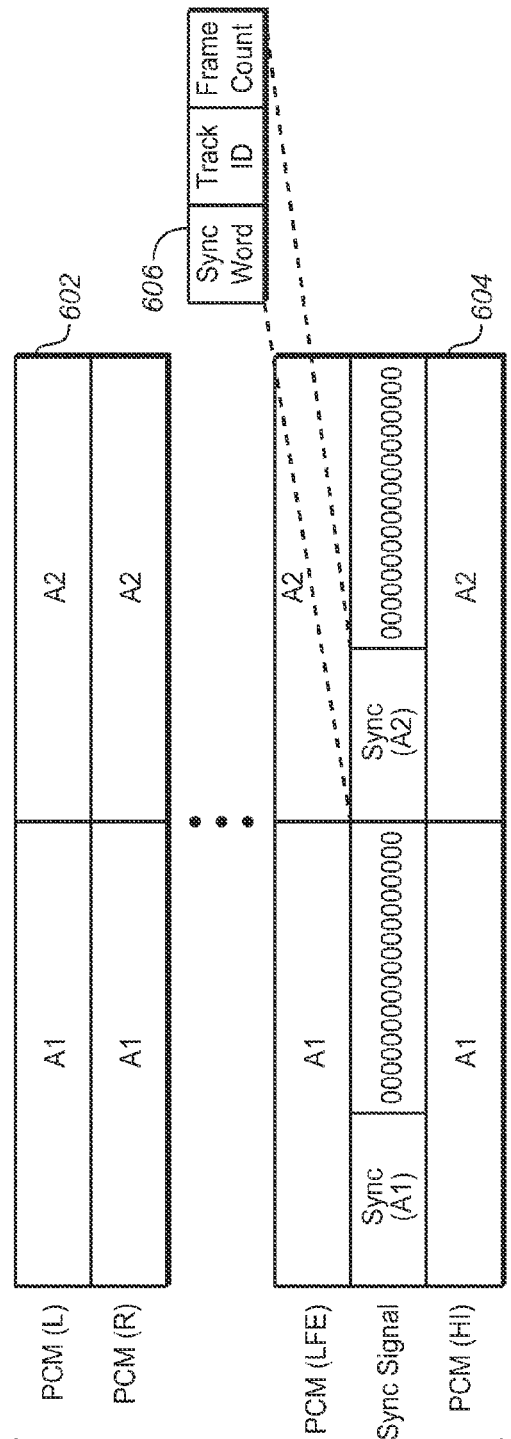
FIG. 6 illustrates the composition of a synchronization signal, under an embodiment.

FIG. 6 illustrates the composition of a synchronization signal, under an embodiment. As shown in FIG. 6, example frames for the PCM left and right channels 602 are denoted A1 and A2. A synchronization signal 606 is provided on a specific channel (e.g., channel 13) within the DCI audio track. The synchronization signal is aligned to beginning of each audio frame (42 ms audio per frame). The synchronization signal 606 contains a synchronization word, the track file ID (UUID), and the frame count (UINT32).

In an embodiment, there may be different synchronization modes including: initial synchronization, seek (which may be the same as initial synchronization), adaptive audio to/from DCI audio switch, and re-synchronization for error recovery. All modes use the same mechanism to decide which audio format to play.

Figure 7:
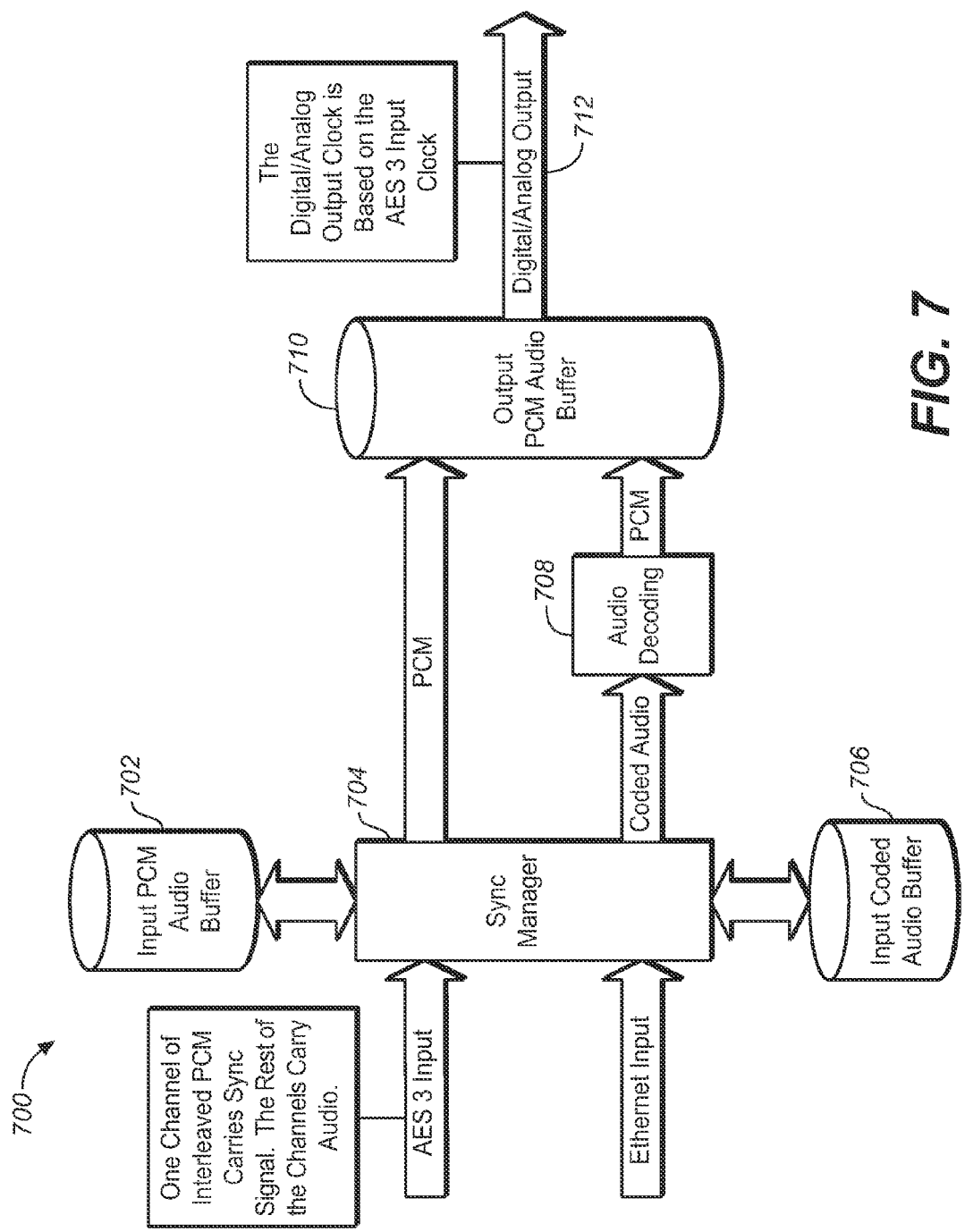
FIG. 7 is a diagram that illustrates the components and process flows for processing a synchronization signal, under an embodiment.

FIG. 7 is a diagram that illustrates the components and process flows for processing a synchronization signal, under an embodiment. As shown in FIG. 7, adaptive audio content and the real-time audio (AES3) channels are input to a synchronization manager 704. For the real-time signals, one channel of the interleaved PCM data carries the synchronization signal, and the rest of the channels carry the multi-channel (surround sound) content. The synchronization manager interfaces to an input PCM audio buffer 702 and an input coded audio buffer 706. The PCM audio data is sent directly to an output PCM audio buffer 710, while the coded audio is sent to an audio decoding block 708, which converts the coded audio into PCM format for input to buffer 710. Buffer 710 then provides the digital/analog output, which is clocked based on the AES input clock.

Figure 8:
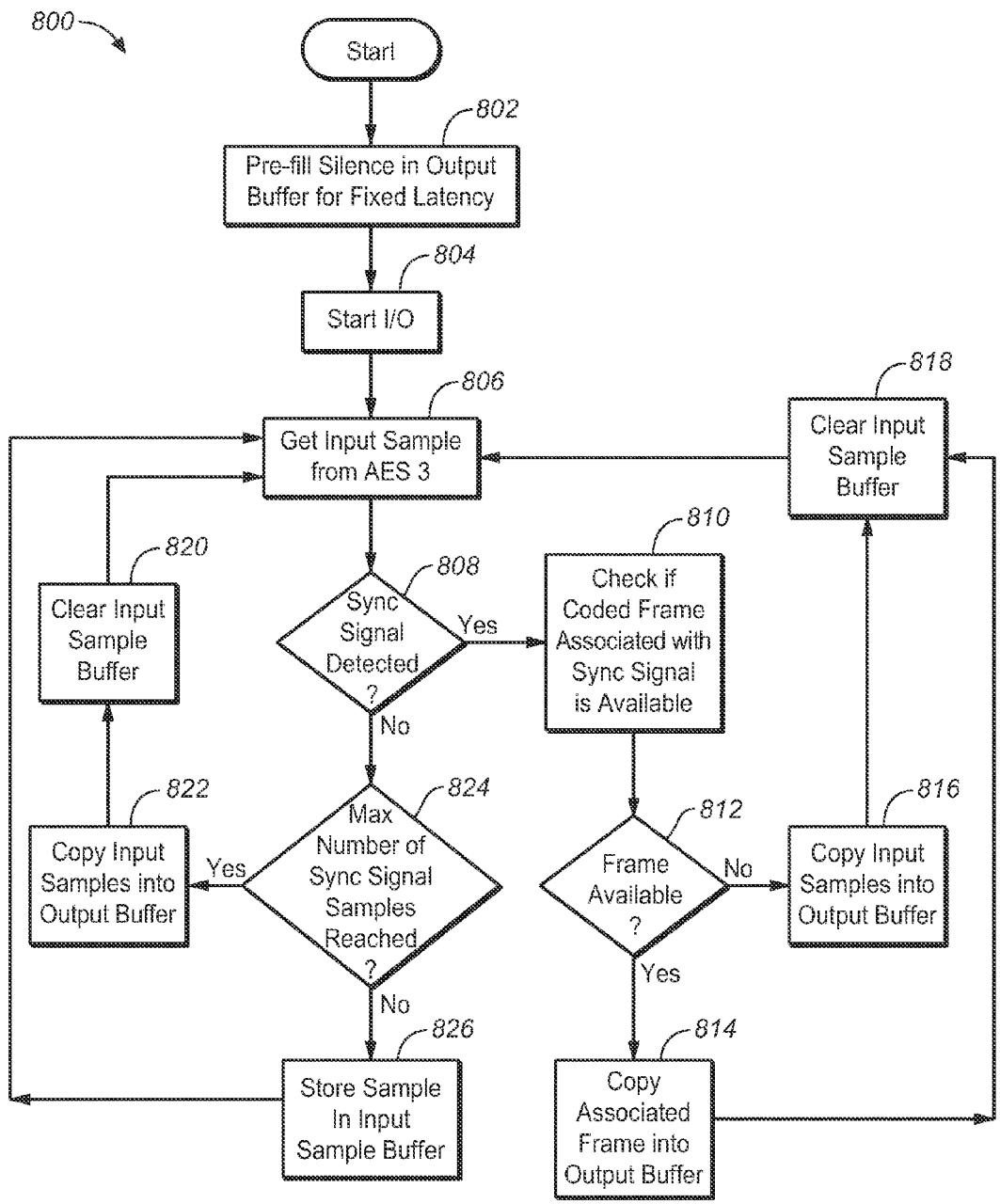
FIG. 8 is a flow diagram that illustrates a method of synchronizing adaptive audio signals using a synchronization signal, under an embodiment.

FIG. 8 is a flow diagram that illustrates a method of synchronizing adaptive audio signals using a synchronization signal, under an embodiment. The process 800 illustrated in FIG. 8 utilizes the buffer and synchronization manager components illustrated in FIG. 7 and the synchronization signal illustrated in FIG. 6. The process of FIG. 8 basically illustrates the buffering of the synchronization signal in the input and output buffers and the storage of a coded frame from the synchronization signal in the output buffer prior to comparison with the adaptive audio frame number. Process 800 starts with the output buffer pre-filled with silence for fixed latency, block 802. The input/output process is then started, block 804. This results in the receipt of an input sample for the real-time audio content, block 806. In decision block 808 it is determined whether or not a synchronization signal is detected. If not, it further determined whether or not a maximum number of synchronization signal samples have been reached, block 824. If not, the sample is stored in the input sample buffer, block 826, and the process proceeds again from block 806. If, in block 824 it is determined that the maximum number has been reached, the input samples are copied to the output buffer, block 822, the input sample buffer is cleared, block 820, and the process proceeds from block 806. If a synchronization signal is detected, as determined in block 808, the process checks if the a coded frame associated with the synchronization signal is available, block 810. If the frame is available, as determined in decision block 812, the associated frame is copied to the output buffer, block 814 and the input sample buffer is cleared, block 818, and the next input sample is obtained, block 806. If the frame is not available, as determined in block 812, the input samples are then copied to the output buffer, block 816, the input sample buffer is cleared, block 818, and the process proceeds by obtaining the next input sample, block 806.

The synchronization mechanism described herein requires minimal media block software changes (audio routing for synchronization track), and represents a simple, non-real-time streaming mechanism from the cinema server to the adaptive audio processor. The buffering scheme from the server 202 to the processor 204 uses the same streaming protocol as from server 202 to the media block 206. This ensures accurate synchronization with the media block, and robustness to media block errors—if the media block 206 drops a frame, the processor 204 will drop a frame. This robust fallback mechanism ensures that audio is always played out.

With regard to Ethernet streaming, the protocol from the server 202 to the adaptive audio processor 204 is similar to the protocol from the server 202 to the media block 206. This is a dedicated Ethernet connection that does not share bandwidth with media block and is a non-real-time interface that is bursted over Ethernet with multiple seconds buffered on the processor 204. There are no hard real-time deadlines for server 202, which simply sends data as fast as possible. The system uses TCP windowing to manage buffer fullness/flow control.

In an example implementation, the content bitrate may be as follows: 250 Mb/s–video+37 Mb/s–DCI audio (16 channels @96 kHz)+147 Mb/s–adaptive Audio (128 channels @48 kHz)=434 Mb/s (current D-Cinema+adaptive audio).

In an embodiment, the adaptive audio system includes mechanisms for addressing certain error conditions including: inserted/dropped audio frame in media block, buffer underflow on the adaptive audio from the server 202 to the adaptive audio processor 204, loss of Ethernet connectivity between server and processor, loss of Ethernet connectivity between server and media block, loss of AES connectivity from the media block to the processor, decryption/decode errors in the processor, and operational errors in the processor.

Further developments include provisions for the adaptive audio content to be played out at a native rate, support for simultaneous AES plus file input, means to monitor for the synchronization signal on real-time audio input, auto-switching between real-time audio and adaptive audio based on the synchronization signal with constant latency, and means to verify that synchronization is maintained in different DCI plus adaptive audio content orderings.

The synchronization signal embedded in the multi-channel audio stream that contains a frame number of the adaptive audio stream to play out provides the basis for a switchover mechanism in the event of error or switching event with respect to the adaptive audio frame. During playout, if an adaptive audio frame is available and the frame number matches the synchronization signal, the adaptive audio frame is played out. If not, the audio will be faded out until it is silent. The real-time audio track will then be faded in. The system will continue to play the real-time audio track until the synchronization signal frame number and adaptive audio frame number match. With respect to the fade in/out period and ramp shape, the parameters in a typical implementation are: 10 ms fade-in and fade-out periods with a linear shape. Once the adaptive audio frames are available and match the synchronization signal, the adaptive audio content is faded back in. In this case, the adaptive audio fades in using the same linear 10 ms fade in period. It should be noted that other fade-in periods and shapes may be implemented depending on particular implementation details.

In an embodiment, the synchronization and switchover methods and components are implemented in an adaptive audio system in which audio objects are treated as groups of sound elements that may be perceived to emanate from a particular physical location or locations in the auditorium. Such objects can be static, or they can move. The audio objects are controlled by metadata, which among other things, details the position of the sound at a given point in time. When objects are monitored or played back in a theatre, they are rendered according to the positional metadata using the speakers that are present, rather than necessarily being output to a physical channel. A track in a session can be an audio object, and standard panning data is analogous to positional metadata. In this way, content placed on the screen might pan in effectively the same way as with channel-based content, but content placed in the surrounds can be rendered to an individual speaker if desired.

Embodiments may be applied to various different types of audio and program content that contain both channel-based surround sound content and adaptive audio content. FIG. 9 is a diagram 900 that illustrates different examples of content that include both real-time audio and adaptive audio, and that may utilize embodiments of a synchronization and switchover process. The content may be based on a single adaptive audio clip that contains object-based audio and associated metadata. A mixed audio format show, such as may be shown in a cinema, can add a trailer and advertisement that both use real-time audio. An advanced audio show may add video content, such as a trailer that contains video content with more adaptive audio content. Such a case is illustrated in FIG. 9 as an interleaved adaptive audio/DCI audio program. Finally, the example content may comprise a mixed video format show that includes real-time audio-based advertisement and trailer content along with an adaptive audio based video program. In general, the adaptive audio processor does not need to be aware of either the synchronization relationship to the video signal or the movie topology. It should be noted that FIG. 9 is included only for purposes of example with regard to implementation, and that many other types and compositions of A/V programs may use aspects of the described embodiments.

Embodiments are generally directed to applications in digital cinema (D-cinema) environments, which utilize the SMPTE 428-3-2006 standard entitled "D-Cinema Distribution Master Audio Channel Mapping and Channel Labeling," which dictates the identification and location of each channel in a D-cinema audio system. Embodiments are also implemented on systems that use the AES3 (Audio Engineering Society) standard for the transport of digital audio signals between professional audio devices. It should be noted that not all embodiments are so limited.

Although embodiments have been described with respect to examples and implementations in a cinema environment in which the adaptive audio content is associated with film content for use in digital cinema processing systems, it should be noted that embodiments may also be implemented in non-cinema environments. The adaptive audio content comprising object-based audio and channel-based audio may be used in conjunction with any related content (associated audio, video, graphic, etc.), or it may constitute standalone audio content. The playback environment may be any appropriate listening environment from headphones or near field monitors to small or large rooms, cars, open-air arenas, concert halls, and so on.

Aspects of the system 100 may be implemented in appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. In an embodiment in which the network comprises the Internet, one or more machines may be configured to access the Internet through web browser programs. Moreover, certain interfaces and links described and illustrated in the Figures may be implemented using various protocols. For example, Ethernet connections may be implemented using any appropriate TCP/IP protocol and wire medium, such as copper, fiber-optic and the like, or they may be substituted with other digital transmission protocols, as appropriate.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing audio signals, comprising:
generating multi-channel audio content comprising channel-based audio signals and playback information specifying speakers of a speaker array through which respective channel-based signals are to be played;
generating adaptive audio content comprising object-based audio signals and three-dimensional location rendering information for the object-based audio signals; wherein the multi-channel audio content or the adaptive audio content are to be played out with video content; wherein the multi-channel audio content is synchronized with the video content; and
providing a synchronization signal along with a current frame of the multi-channel audio content for synchronizing playback of the object-based audio signals relative to the video content, wherein the synchronization signal includes track identifier and frame count information for a current track and a current frame of the adaptive audio content; wherein the current frame of the adaptive audio content is to be played out if a track identifier and frame count of the received adaptive audio content matches the track identifier and frame count in the synchronization signal, and otherwise the multi-channel audio content is to be played back.

2. The method of claim 1 further comprising:
comparing the track identifier and frame count information in the synchronization signal for the adaptive audio content with the track identifier and frame count information for a received object-based audio signal of the adaptive audio content; and
implementing a switchover process if the track identifier and frame count information in the synchronization signal does not match the track identifier and frame count information for the received object-based audio signal, or if the synchronization signal is not present.

3. The method of claim 2 wherein the switchover process comprises:
fading out the object-based audio signals until a silence threshold is reached; and
fading in the channel-based audio signals.

4. The method of claim 3 wherein, upon a match of the track identifier and frame count information in the synchronization signal with track identifier and frame count information for a subsequent received object-based audio signal, the switchover process further comprises:
fading out the channel-based audio signals; and
fading in the subsequent object-based audio signals.

5. The method of claim 1 wherein the synchronization signal is included as part of an audio visual input signal that contains the video content, the multi-channel audio content, and the adaptive audio content.

6. The method of claim 1 wherein the synchronization signal is generated automatically by a media block component that formats the multi-channel audio content received in accordance with a digital audio signal transport standard to produce real-time audio content.

7. A system for synchronizing audio and video signals comprising:
a server receiving an audio visual signal and outputting video content and multi-channel audio content over a first Ethernet connection and outputting adaptive object-based audio content over a second Ethernet connection; wherein the multi-channel audio content is synchronized with the video content;
a media block coupled to the server over the first Ethernet connection and receiving the multi-channel audio content and outputting the multi-channel audio content, wherein a current frame of the multi-channel audio content is output along with a synchronization signal containing track identifier and frame count information for a current frame of the adaptive object-based audio content for comparison with track identifier and frame count information of the adaptive object-based audio content;
an adaptive audio processor coupled to the server over the second Ethernet connection and to the media block and receiving the multi-channel audio content, the synchronization signal and the adaptive object-based audio content;
a comparator circuit of the adaptive audio processor comparing a track identifier and frame count of the received adaptive object-based audio content with the track identifier and frame count in the synchronization signal; and
a playback system configured to render and playback the current frame of the adaptive object-based audio content if the track identifier and frame count of the received adaptive object-based audio content matches the track identifier and frame count in the synchronization signal, and otherwise to playback the multi-channel audio content.

8. The system of claim 7 wherein the multi-channel audio content comprises digital cinema content including channel-based audio for playback through a surround sound audio system.

9. The system of claim 8 further comprising a speaker array including surround sound speakers positioned in a defined surround configuration and a plurality of additional speakers positioned in a room defining an audio playback environment.

10. The system of claim 9 wherein the adaptive object-based audio content comprises object-based audio signals and metadata comprising three-dimensional location information specifying a location in three-dimensional space that respective signals of the object-based audio signals are intended to emanate from in a playback environment containing the speaker array.

11. The system of claim 10 further comprising a switchover component configured to fade out audio playback through the speaker array if the track identifier and frame count of the received adaptive object-based audio content does not match the track identifier and frame count encoded in the synchronization signal, fade in and playback the multi-channel audio content until the frame number of the received adaptive object-based audio content matches the frame number encoded with the synchronization signal, and then fade in a subsequent adaptive audio frame when its track identifier and frame count matches the track identifier and frame count encoded with the synchronization signal after fading out the multi-channel audio content.

12. The system of claim 11 wherein the multi-channel audio content is formatted as real-time audio, and wherein the synchronization signal comprises an AES synchronization signal that is embedded in a DCI audio track file of the multi-channel audio content.

13. The system of claim 12 wherein the synchronization signal is formatted as a SMPTE 337M non-audio stream signal, and comprises a plurality of data fields specifying at least a track identifier and frame count.

14. The system of claim 13 further comprising a synchronization manager component receiving both the multi-channel audio content and the adaptive object-based audio content, and one or more input and output buffers coupled to the synchronization manager component for storing audio samples of the multi-channel audio content.

15. A method for synchronizing audio and video signals comprising:
receiving an input audio visual signal and outputting video content and multi-channel audio content over a first Ethernet connection and adaptive object-based audio content over a second Ethernet connection; wherein the multi-channel audio content is synchronized with the video content;
receiving the multi-channel audio content in a media block and outputting the multi-channel audio content, wherein the multi-channel audio content is provided along with frame information including a track identifier and frame count for the adaptive object-based audio content for synchronizing frames of the adaptive object-based audio content to corresponding frames of the multi-channel audio content;
comparing a track identifier and frame count of a current frame of the received adaptive object-based audio content with the track identifier and frame count provided with a current frame of the multi-channel audio content; and
rendering and playing back the adaptive object-based audio content if the track identifier and frame number of the received adaptive object-based audio content matches the track identifier and frame number associated with the multi-channel audio content, and otherwise playing back the multi-channel audio content.

16. The method of claim 15 wherein the multi-channel audio content comprises digital cinema content including channel-based audio for playback through a surround sound audio system that includes surround sound speakers positioned in a defined surround configuration and a plurality of additional speakers positioned in a room defining an audio playback environment.

17. The method of claim 16 wherein the adaptive object-based audio content comprises object-based audio signals and metadata comprising three-dimensional location information specifying a location in three-dimensional space that respective signals of the object-based audio signals are intended to emanate from in a playback environment containing the surround sound audio system.

18. The method of claim 17 further comprising:
fading out audio playback through the surround sound audio system if the track identifier and frame count of the received adaptive object-based audio content does not match the track identifier and frame count encoded in the multi-channel audio content; and
fading in the multi-channel audio content until the track identifier and frame count of the received adaptive object-based audio content matches the frame number associated with the multi-channel audio content.

19. A method for processing audio signals, comprising:
generating multi-channel audio content comprising channel-based audio signals and playback information specifying speakers of a speaker array through which respective channels of the channel-based audio signals are to be played;
generating adaptive audio content comprising object-based audio signals and three-dimensional location rendering information for the object-based audio signals;
providing a synchronization signal along with the multi-channel audio content for synchronizing playback of the object-based audio signals relative to video content to be played back with the multi-channel audio content or the adaptive audio content; wherein the multi-channel audio content is synchronized with the video content; and
implementing a switchover process to play back a current frame of the channel-based audio signals with the video content if a comparison of track identifier and frame count information of a current frame of the adaptive audio content included in the synchronization signal with track identifier and frame count information of the current frame of the adaptive audio content results in a mismatch.

20. The method of claim 19 wherein the synchronization signal includes track identifier and frame count information for a current track of the adaptive audio content.

* * * * *